US012808560B2

(12) United States Patent
Sipe et al.

(10) Patent No.: US 12,808,560 B2
(45) Date of Patent: Nov. 24, 2026

(54) SYSTEM AND METHOD OF ADVANCED DIGITAL ECONOMIZATION

(71) Applicant: Pro Star Energy Solutions, L.P., Frisco, TX (US)

(72) Inventors: Justin James Sipe, Federal Way, WA (US); Daniel E. Miller, Renton, WA (US); Gerald B. Scott, Seattle, WA (US); Kenneth Hellewell, Seattle, WA (US)

(73) Assignee: Pro Star Energy Solutions, L.P., Frisco, TX (US)

( * ) Notice: Subject to any disclaimer, the term of this patent is extended or adjusted under 35 U.S.C. 154(b) by 469 days.

(21) Appl. No.: 17/588,603

(22) Filed: Jan. 31, 2022

(65) Prior Publication Data

US 2022/0155743 A1 May 19, 2022

Related U.S. Application Data

(63) Continuation of application No. 15/262,877, filed on Sep. 12, 2016, now Pat. No. 11,237,537, which is a (Continued)

(51) Int. Cl.

*F24F 11/46* (2018.01)
*F24F 11/00* (2018.01)
*F24F 11/30* (2018.01)
*F24F 11/38* (2018.01)
*F24F 11/52* (2018.01)
(Continued)

(52) U.S. Cl.

CPC .......... *F24F 11/46* (2018.01); *F24F 11/0001* (2013.01); *F24F 11/30* (2018.01); *F24F 11/38* (2018.01); *F24F 11/52* (2018.01); *F24F 11/62* (2018.01); *F24F 11/64* (2018.01); *F24F 11/77* (2018.01); *G05B 19/0428* (2013.01); *F24F 2011/0002* (2013.01); *F24F 2011/0006* (2013.01); *F24F 11/65* (2018.01); *F24F 2110/10* (2018.01); *F24F 2110/12* (2018.01); *F24F 2140/00* (2018.01); *G05B 2219/2614* (2013.01); *Y02B 30/54* (2013.01)

(58) Field of Classification Search

None

See application file for complete search history.

(56) References Cited

U.S. PATENT DOCUMENTS 4,362,026 A 12/1982 Miller
4,530,395 A 7/1985 Parker et al.
(Continued)

OTHER PUBLICATIONS

AAON, "Single Zone VAV Discover how to save money, reduce energy consumption and lower sound levels." 12pp., 2002.
(Continued)

*Primary Examiner* — Nathan L Laughlin
(74) *Attorney, Agent, or Firm* — Harness, Dickey & Pierce, P.L.C.

(57) ABSTRACT

Systems and methods include a controller that compares an indoor temperature with a dead-band range having a heating setpoint and a cooling setpoint and that operates an HVAC system in an economizer mode to cool an indoor building space by introducing outside air to the indoor building space, prior to a call for cooling being received, in response to the indoor temperature being within the dead-band range and increasing.

6 Claims, 11 Drawing Sheets

Related U.S. Application Data continuation of application No. 13/844,158, filed on Mar. 15, 2013, now Pat. No. 9,494,334.

(51) Int. Cl.

| | |
|---|---|
| ***F24F 11/62*** | (2018.01) |
| ***F24F 11/64*** | (2018.01) |
| ***F24F 11/77*** | (2018.01) |
| ***G05B 19/042*** | (2006.01) |
| *F24F 11/65* | (2018.01) |
| *F24F 110/10* | (2018.01) |
| *F24F 110/12* | (2018.01) |
| *F24F 140/00* | (2018.01) |

(56) References Cited

U.S. PATENT DOCUMENTS

| | | | | |
|---|---|---|---|---|
| 4,843,084 | A | 6/1989 | Parker et al. | |
| 4,884,214 | A | 11/1989 | Parker et al. | |
| 5,261,481 | A | 11/1993 | Baldwin et al. | |
| 5,544,809 | A | 8/1996 | Keating et al. | |
| 5,931,227 | A | 8/1999 | Graves | |
| 5,971,067 | A | 10/1999 | Rayburn et al. | |
| 6,006,142 | A | 12/1999 | Seem et al. | |
| 6,161,764 | A | 12/2000 | Jatnieks | |
| 6,491,094 | B2 | 12/2002 | Rayburn et al. | |
| 6,629,886 | B1 | 10/2003 | Estepp | |
| 6,698,219 | B2 | 3/2004 | Sekhar et al. | |
| 6,792,767 | B1 | 9/2004 | Pargeter et al. | |
| 6,916,239 | B2 | 7/2005 | Siddaramanna et al. | |
| 7,086,240 | B1 | 8/2006 | Zugibe et al. | |
| 7,130,719 | B2 | 10/2006 | Ehlers et al. | |
| 7,130,720 | B2 | 10/2006 | Fisher | |
| 7,216,015 | B2 | 5/2007 | Poth | |
| 7,377,450 | B2 | 5/2008 | Van Ostrand et al. | |
| 7,434,413 | B2 | 10/2008 | Wruck | |
| 7,510,126 | B2 | 3/2009 | Rossi et al. | |
| 7,516,044 | B2 | 4/2009 | Engle | |
| 7,797,080 | B2 | 9/2010 | Durham, III | |
| 7,886,986 | B2 | 2/2011 | Fischer, Jr. et al. | |
| 7,918,407 | B2 | 4/2011 | Patch | |
| 8,027,742 | B2 | 9/2011 | Seem et al. | |
| 8,554,376 | B1 | 10/2013 | Matsuoka et al. | |
| 2003/0181158 | A1 | 9/2003 | Schell et al. | |
| 2006/0174560 | A1 | 8/2006 | Levine et al. | |
| 2009/0140060 | A1 * | 6/2009 | Stoner | G05D 23/1934 236/51 |
| 2009/0236432 | A1 | 9/2009 | Malloy | |
| 2010/0082161 | A1 | 4/2010 | Patch | |
| 2011/0046790 | A1 | 2/2011 | Miller et al. | |
| 2011/0047418 | A1 | 2/2011 | Drees et al. | |
| 2011/0097988 | A1 * | 4/2011 | Lord | F24F 11/77 454/329 |
| 2011/0172831 | A1 | 7/2011 | Kreft et al. | |
| 2011/0264273 | A1 | 10/2011 | Grabinger et al. | |
| 2012/0209573 | A1 * | 8/2012 | Karrat | G06Q 10/067 703/1 |
| 2012/0221151 | A1 | 8/2012 | Steinberg | |
| 2012/0283880 | A1 | 11/2012 | Kreft et al. | |
| 2013/0024028 | A1 | 1/2013 | Hadzidedic | |
| 2013/0124003 | A1 | 5/2013 | Lehman | |
| 2013/0153197 | A1 * | 6/2013 | Havard, Jr. | F25B 49/02 236/49.3 |
| 2013/0161403 | A1 | 6/2013 | Douglas et al. | |
| 2014/0207288 | A1 | 7/2014 | Albrecht et al. | |
| 2014/0277756 | A1 | 9/2014 | Bruce et al. | |

OTHER PUBLICATIONS

AAON, "Single Zone VAV Rooftopis Winner in 'ACHR News' 2011 Dealer Design Competition." Marketwire, 5pp., 2011.

Brown, Adrienne, "Mazimize Energy Savings with Economizer Controls." The Air Conditioning, Heating, and Refrigeration News, 3pp., 1996.

Emerson Retail Services, "The Application of Electronic Variable Speed Drives to Small Packages Rooftop HVAC Units." 5pp., 2005.

Honeywell Product Data Brochure 63-2528 "W6210A,D and W7210A, D Solid State Econimizer Logic Module." 16pp., 1996.

Honeywell Product Data Brochure 63-2544 "W6215, W7215, W7460 EconomizerTM Logic Module for Ventilation Control." 32pp., 1998.

Honeywell Product Data Brochure 63-2684 "7459A, B, C, D, Solid State Economizer Logic Module." 16pp., 2009.

Honeywell Publication 63-7036 "Solid State Economizer." 21pp., 1998.

Honeywell Publication 63-8491 "The Cool Solution Honeywell Solid-State Economizer Systems." 4pp., 1996.

Honeywell Publication 63-8542 "A Computer Study of the Energy Savings from using Various Economizer Changeover Strategies in a Retail Store." 16pp., 1997.

Honeywell Publication 63-8586 "Economizer Systems Quick Slection Gruide." 4pp., 1998.

Honeywell Publication 63-8588 "Fresh Air Economizer." 4pp., 1998.

Honeywell Publication 63-8594 "Design and Application Guide for Honeywell Economizer Controls." pp. 52-108. 1998.

Honeywell Publication 63-9058 "Research Finds Economizer Plus Demand Control Ventilation Delivers Highest Energy Savings." 6pp., 1998.

Wacher, P.C., "Economizer Savings Study." 5pp., 1989.

* cited by examiner

SYSTEM AND METHOD OF ADVANCED DIGITAL ECONOMIZATION

CROSS-REFERENCE TO RELATED APPLICATIONS

This application is a continuation of co-pending U.S. patent application Ser. No. 15/262,877, filed on Sep. 12, 2016, entitled "System and Method of Advanced Digital Economization," which is a continuation of U.S. patent application Ser. No. 13/844,158, filed on Mar. 15, 2013, entitled "Method of Advanced Digital Economization," now issued as U.S. Pat. No. 9,494,334. The entire disclosures of each of the above applications are incorporated herein by reference.

TECHNICAL FIELD

The present invention relates generally to advanced economization strategies for HVAC systems. More particularly, the present invention relates to a new system and method for advanced digital economization that utilizes outside air as a cooling asset to reduce energy usage through preemptive cooling before a command for cooling is received.

BACKGROUND OF THE INVENTION

A common component of a Heating, Ventilation, and Air Conditioning (HVAC) system is an economizer. The economizer is an arrangement of dampers, actuators, sensors, and controllers that are used to bring outside air into the space. It serves two primary purposes by providing ventilated fresh air to meet the needs of occupants and free cooling benefit when conditions are appropriate.

There are various economizer control strategies relying on different sensor types (dry bulb, enthalpy, and dew point) that are used to determine when outside air is appropriate for free cooling. When the thermostat, or other controls, communicate a cooling call to the HVAC unit, the economizer controller uses one of the strategies above to determine if the outside air is suitable for free cooling. If the air is suitable, the outside air damper will open, and the system will use outside air to address the cooling needs of the space. The current practice of economizer use waits until there is a cooling call before the economizer cycle is engaged. It is typically used as the first step in responding to a call for cooling from the HVAC system. A secondary step is to initiate costly mechanical cooling. There is no electrical cost to use the economizer cycle so it is considered free cooling. The present invention expands the use of the economizer cycle beyond the current practice of waiting for a call for cooling.

Building codes have established minimum fresh air requirements to provide proper ventilation to an occupied space. Setting a minimum economizer outside air damper position is the most common way that the fresh air is introduced to the building via the HVAC supply fan. HVAC systems are designed to meet the heating and cooling needs of a facility based on the hottest and coldest conditions. Similarly, the ventilation rates are based around the maximum number of occupants the space is likely to experience. In most cases this leads to an over-ventilation of the space. In the late 1990's a control practice called demand control ventilation (DCV) was introduced that allows economizers to set a minimum base ventilation level based on square footage and increase ventilation based on an increase in occupancy as measured by a sensor such as a CO2 sensor. DCV saves energy by addressing the over-ventilation that is present in a standard system. The current art surrounding Demand Control Ventilation does not take into account outside air temperature or the heating/cooling needs of the space. The invention is an improvement over the current art of DCV in that it addresses the unintended consequence of Demand Control Ventilation as it is currently practiced. The inventors have documented that current DCV approaches result in increased energy use under certain common conditions. A decrease in the minimum outside air damper position, which is inherent in the current practice of DCV, actually deprives the treated space of outside air that is beneficial. This occurs when the treated space has a cooling disposition and the outside air is suitable for free cooling benefit. Commercial buildings have a consistent increase in what is known as cooling load over the course of a typical day. Once a facility is occupied in the morning, the internal loads increase as the number of occupants increase, computers and machinery are activated, lights are turned on, and external temperatures and solar impact increase. Cumulatively, these factors cause the internal temperature within the occupied space to increase as the day goes on. It is this increase in the space temperature above the heating setpoint that constitutes a cooling disposition. Eventually the temperature will increase to a point that the HVAC cooling setpoint will be exceeded, causing the cooling cycle to be initiated. The first time this occurs in any given day is considered the first cooling call of the day.

The current practice of DCV reduces the percentage of outside air delivered to the space regardless of the disposition of the space. Reducing the amount of beneficial outside air when the space has a cooling disposition increases the rate of temperature rise within the space and the first cooling call of the day will occur earlier than had DCV not been deployed. DCV is indeed an energy efficiency strategy when outside air is unfavorable but not when outside air is favorable for meeting the cooling needs of the space. It then has a detrimental impact on energy use. This fact has eluded the energy efficiency community. The inventors have unique resources that brought this fact to light. The invention addresses this problem in the prior art.

HVAC systems can be equipped with a constant volume or variable speed fan. The variable speed fan will modulate based on the demands of the space that is served by the fan. When the space is in the dead-band, or satisfied state, there is the opportunity for additional energy savings. Traditional HVAC systems treat the variable fan and the economizer as separate pieces, and they are often operated independently of one another. The inventors have addressed this system deficiency, and operate the fan and economizer as a single assembly that is used to provide ventilation air to a space. The efficiency of the system is increased by slowing down the fan speed and opening up the economizer to achieve the equivalent outside airflow. The fan energy is reduced when it runs at slower fan speeds. The current invention can operate in conjunction with either a constant volume or variable speed fan system. The energy improvement over the existing art in economizer control is amplified with the presence of variable fan speed capability by delivering favorable outside air for free cooling in the comfort dead-band with only a fraction of the fan energy used by a constant volume fan.

Economizers are subject to a host of field related issues and the vast majority of the economizers don't work. Many technicians are not properly trained on how to test economizers and they are often ignored during preventative maintenance visits. Depending on the specific economizer failure it is possible that it will result in the ability to use outside air for free cooling and increase overall HVAC system energy use. These failures are such that they may cause more energy use than if the unit had never been equipped with an economizer. While required by mechanical and energy codes in most jurisdictions, the assumption is that they will operate as intended. It has been well documented that economizers not only have a high failure rate, the problems often go undetected for years. The lack of operator feedback when an economizer failure occurs is a major issue that experts are seeking to find a viable solution for.

The present invention addresses the deficiencies in the current use of economizers for free cooling and demand control ventilation while providing advances in operational accountability. By leveraging new sensors and control sequences, economizers can be operated in a smarter way that will bring a new level of energy savings and assure that they persist for the life of the system.

SUMMARY OF THE INVENTION

The invention is both a method and system that can be summarized as an advanced economizer control strategy—able to anticipate and preemptively address the cooling needs of an occupied space. It increases the energy savings available from the use of an economizer with or without demand control ventilation (DCV). It could be adapted as a retrofit upgrade to an existing economizer system, programmed as a control feature by building automation specialists, or included on factory-produced new equipment. The energy improvement possible with the invention is increased on systems equipped with demand control ventilation (DCV) and further increased on systems with variable supply fan speed control. It may provide economizer efficiency verification, fault detection, auto-configuration, self-correction routines and notify the operator of system issues. In certain embodiments it will include self-learning capabilities that leverage sensors to determine and predict the heating & cooling dead-band range of the space as part of the invention's operational sequence. In other embodiments the HVAC system's dead-band range may be determined by fixed settings or temperature parameters.

The invention overcomes the limitations and excess energy use produced by standard demand control ventilation (DCV) practices by considering the value of outside air as a resource and whether a cooling disposition exists within the treated space. It also leverages improved control sequences that increase both the free cooling benefit and the amount of ventilated fresh air that is brought into the space to proactively cool the space in advance of a call for cooling. It includes the ability to work in concert with variable supply fan speed control to create a highly optimized and efficient HVAC system. The invention can simultaneously lower the fan speed and increase the economizer position to maintain a target air flow through the economizer and decrease the fan energy usage of the system in all economizing modes. The invention may be practiced as a system by combining all of these functions into a single device or deployed in conjunction with a collection of separate components. Other manufacturers may apply the invention in various forms such as on-board unitary controls, mini-processors, or building automation control systems.

These and other advantages will become more apparent upon review of the Drawings, the Detailed Description of the Invention, and the Claims.

BRIEF DESCRIPTION OF THE DRAWINGS

Like reference numerals are used to designate like parts throughout the several views of the drawings, wherein.

DETAILED DESCRIPTION OF THE INVENTION

Referring to FIGS. 1-9, and 11, the present invention is directed to a system and method for utilizing advanced digital control economizer strategies that reduce energy usage by employing outside air as a cooling asset when the building space has not triggered a call for cooling. Essentially, a building space is preemptively cooled (or "pre-cooling") in optimum dead-band ranges that are established.

According to one aspect of the invention, the system utilizes an advanced digital economizer (ADE) that consists of a computerized processing unit, environmental sensors, and an interface to an HVAC system. The ADE includes the ability to connect to the HVAC conditioning control points, fan command and fan speed, and an economizer actuator. It has the ability to provide standard low voltage thermostat type control signals to HVAC equipment and modulating resistive or voltage signal to the economizer actuator. The ADE can be used with either new or existing equipment. The ADE can be implemented in a commercially available controller (like an Easy IO 32), a PLC (like an ABB AC500), or embedded directly on a programmable chip (like a MicroChip PIC24). At its core is the ability to store instructions, accept commands, retain setpoints, and react to sensor inputs.

The ADE can use temperature and humidity sensors to monitor environmental conditions. The sensor will provide a varying electrical signal based upon the conditions. For example, the temperature sensor could be a 10K NTC thermistor that changes the resistive value based on temperature changes. For humidity measurements, the sensor could be a 0-10 VDC sensor, where the voltage output changes based on changes in the humidity. It is also required for the ADE to receive indication of the space conditions.

This can come either from a variable resistive or voltage signal, but it can also be transmitted to the controller through on/off or digital inputs.

Figure 10:
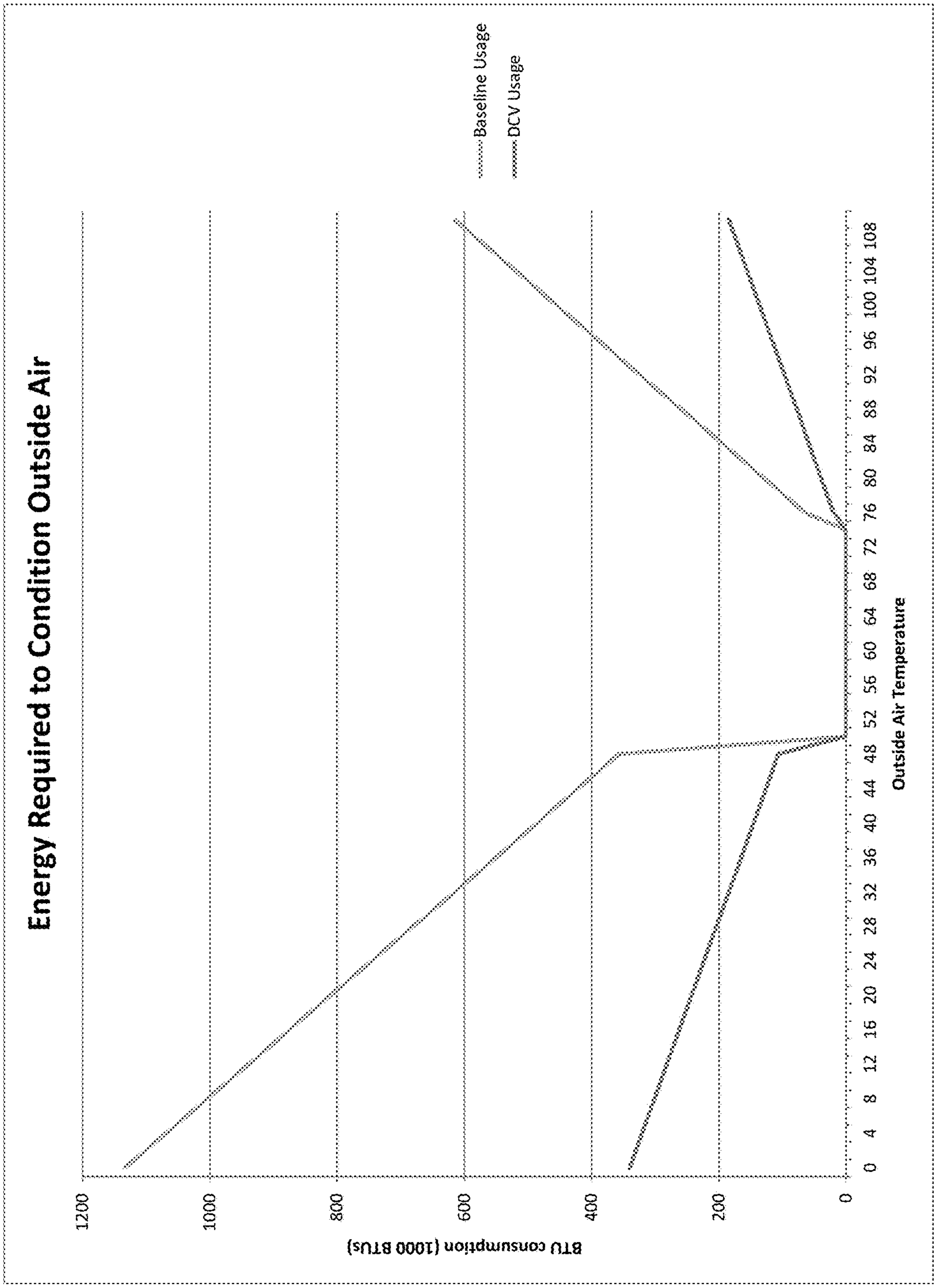
Fig. 10 Prior Art
FIG. 10 is a chart illustrating energy required to condition outside air.

The prior art for demand control ventilation provides energy savings when the outside air temperature is extreme. The reduction in outside air results in energy savings. The outside air that is brought into the space has to be treated to reach proper occupant comfort level. This is demonstrated in FIG. 10. The darker shade bar shows the energy that would be required to treat the outside air in the standard condition (baseline usage), and the lighter shade bar represents the energy required to treat the air when DCV is used. As the temperature gets more extreme, the energy savings increase because the temperature difference between the outside air and the space comfort levels is greater.

Figure 11:
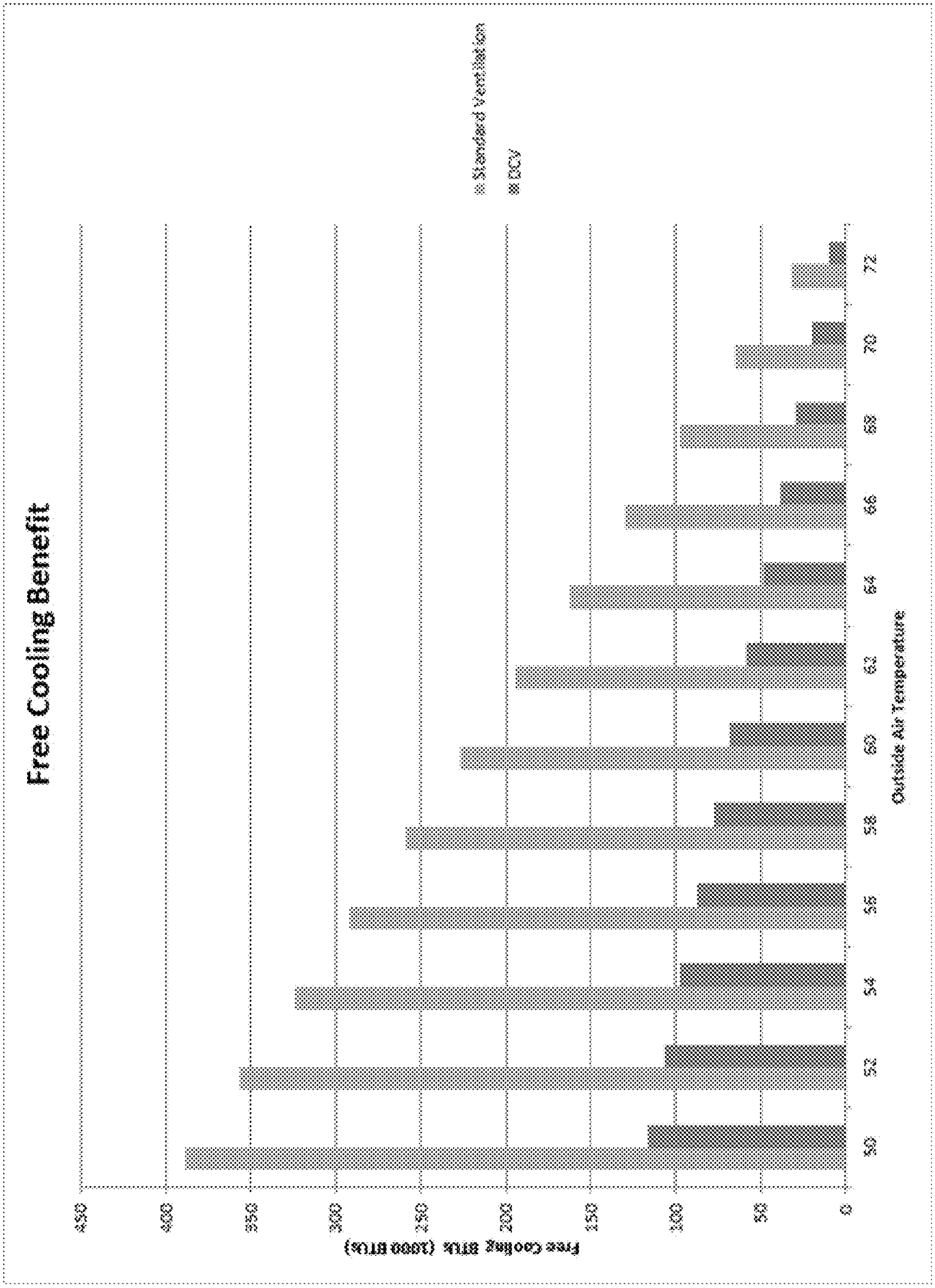
FIG. 11 is a chart illustrating free cooling benefit.

During mild conditions when the outside air could be used for free cooling. DCV would result in an energy penalty. DCV provides a reduction in outside air. As demonstrated in the chart in FIG. 11, the reduction in outside air during mild conditions reduces the amount of free cooling that is provided by a traditional system. The present invention overcomes the limitation of prior art, and when the system enters the dead-band mode, the invention will allow the free cooling benefit to be provided to the space. As further defined the specific dead-band mode for each unit can be set using setpoints [8.4 and 8.7] or the dead-band range can be learned based on the actual system performance [8.3 and 8.6] in FIG. 8. FIG. 11 illustrates typical savings that can be achieved through free cooling.

Figure 2:
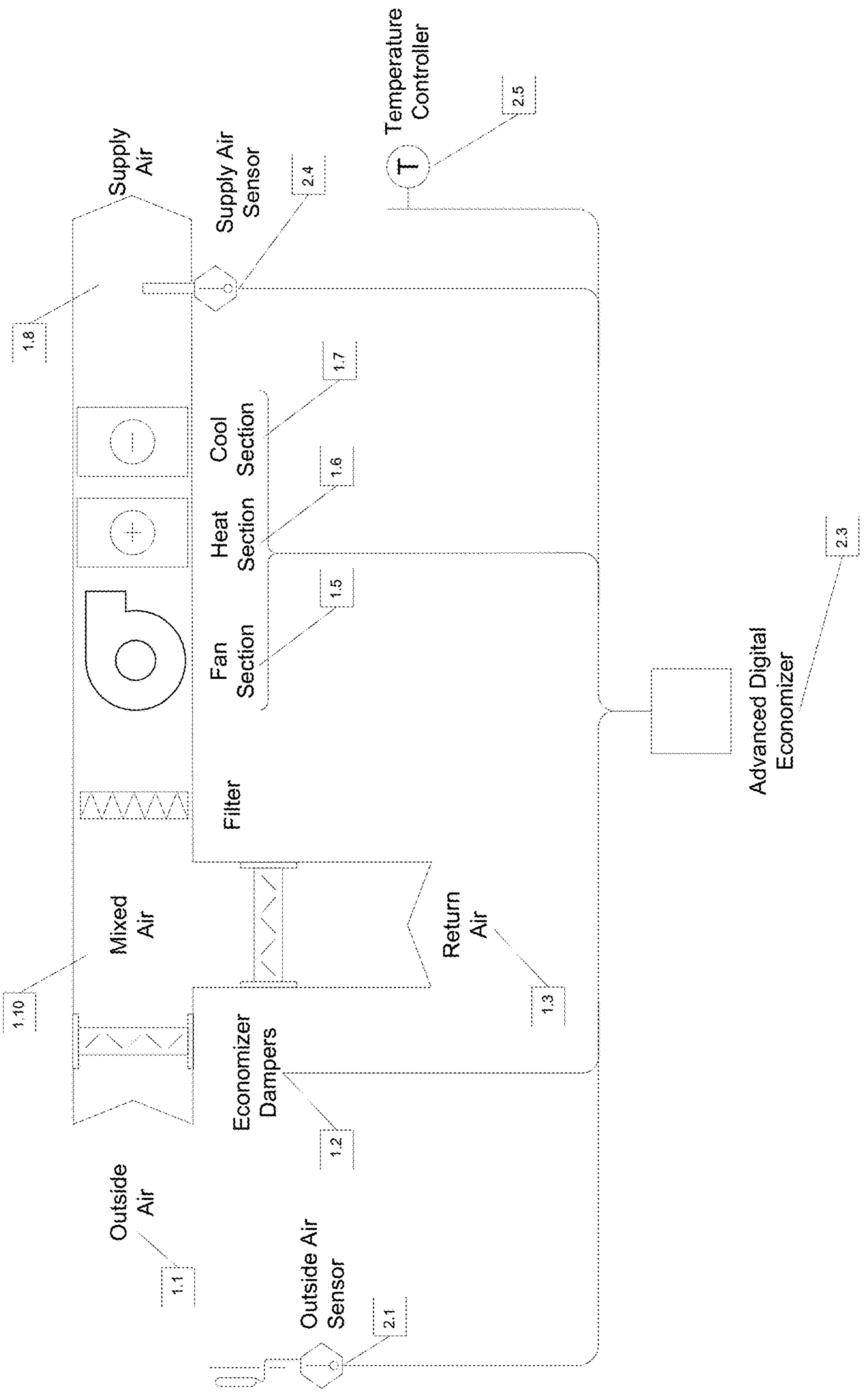
FIG. 2 is a schematic diagram illustrating the base version of the present invention.
Figure 3:
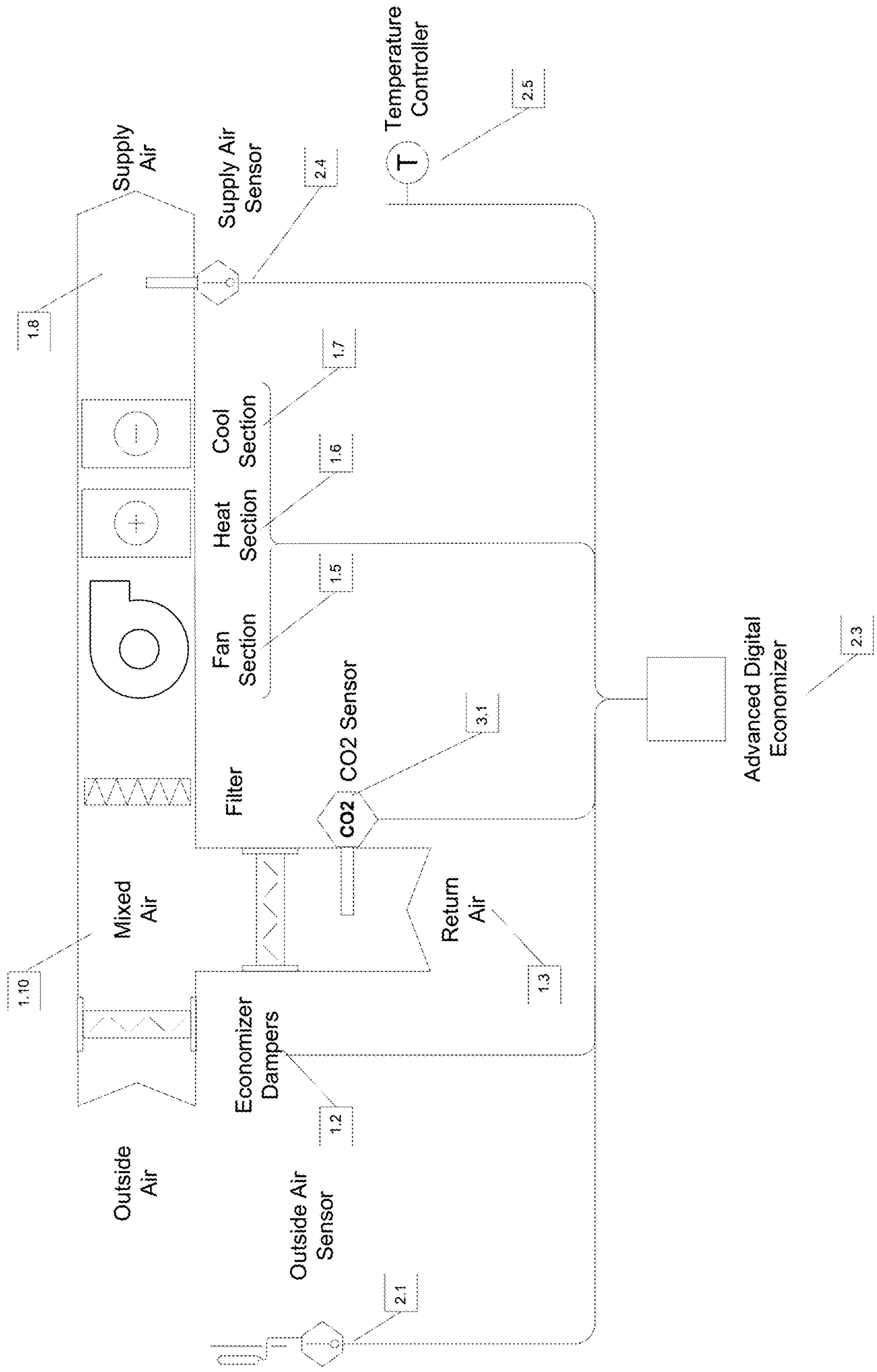
FIG. 3 is a schematic diagram illustrating an alternate embodiment of the present invention including a sensor to determine space occupancy.

Referring to FIG. 2, in the base control mode the ADE will only use the outside air [2.1] and the supply air [2.4] environmental sensors to manage the economizer [2.3] and ventilation [1.5] (fan) functions. A space balance point and space high economizer cut out will be used to determine the operating mode. If space is satisfied, the outside air is greater than the balance point and it is less than the high economizer cut out, the unit will enter the advanced ventilation mode. During the advanced ventilation mode the economizer damper [1.2] will be opened and modulated to maintain a supply air setpoint as determined by the controller. The default supply air setpoint is 59° F. The controller will have default settings of 50° F. for the balance point and 70° F. for the high economizer cut-out. When the outside air is outside of the advanced ventilation band, the economizer will be controlled to minimum position. The minimum position will either be set by the DCV strategy as defined above, or it will be controlled to a fixed outside air volume, typically 25%.

Figure 8:
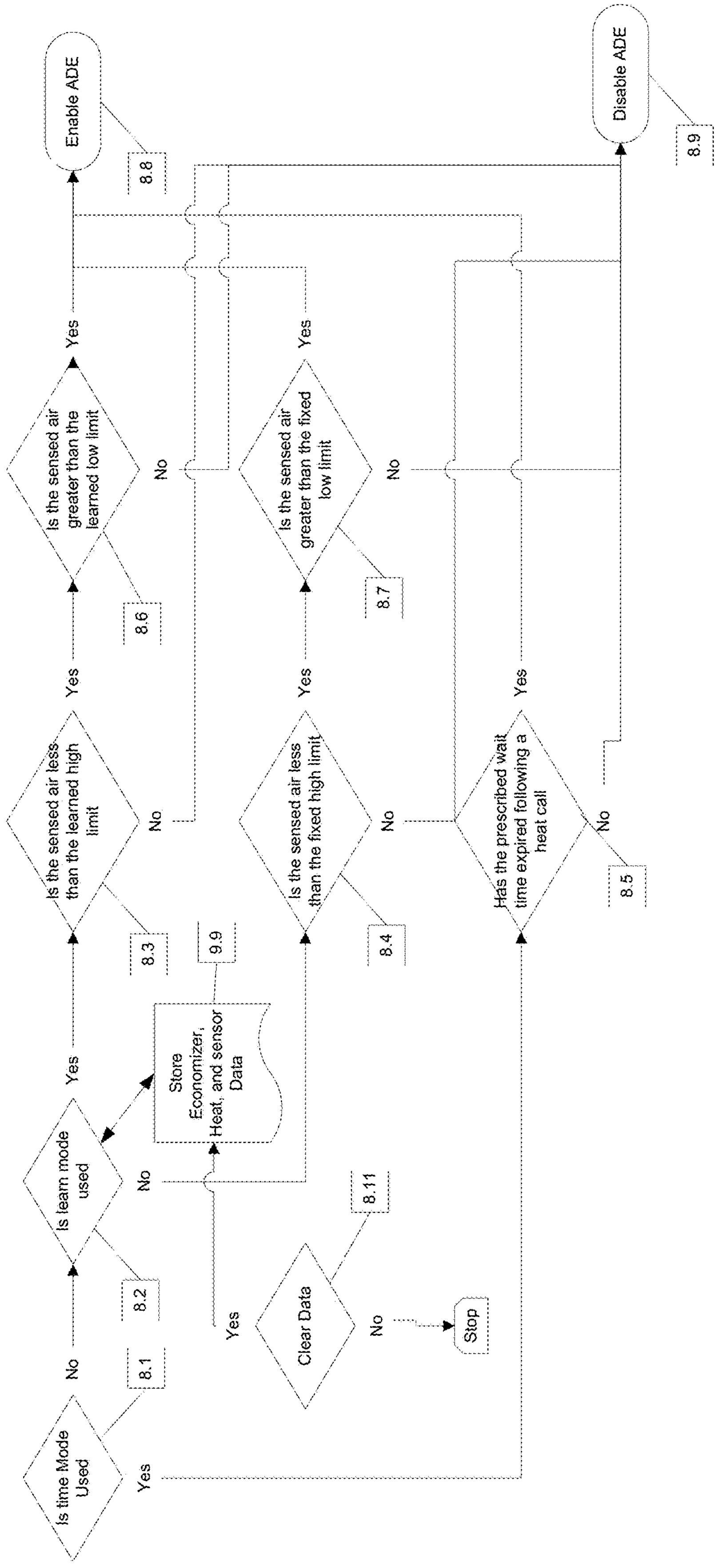
FIG. 8 is a schematic diagram illustrating the control logic for the ventilation dead-band determination.

Referring now to FIG. 8, and still in the base mode, the controller will have the ability to learn the balance point of the space [8.1-8.9]. The controller will log [9.9] the outside conditions when the system transitions into the heating mode. It will store previous logged values, typically up to 10 values, and average the logged values together. To reduce the potential for the advanced ventilation to drive the system into heating mode, the learned balance point will be the average value plus one degree. Advanced ventilation will not be allowed when the outside air conditions are lower than the learned balance point [8.3]. The controller will store the learned balance point in the event of a power failure, a calibration or relearn request [8.11] will be sent to the controller to reset the learned balance point.

Figure 4:
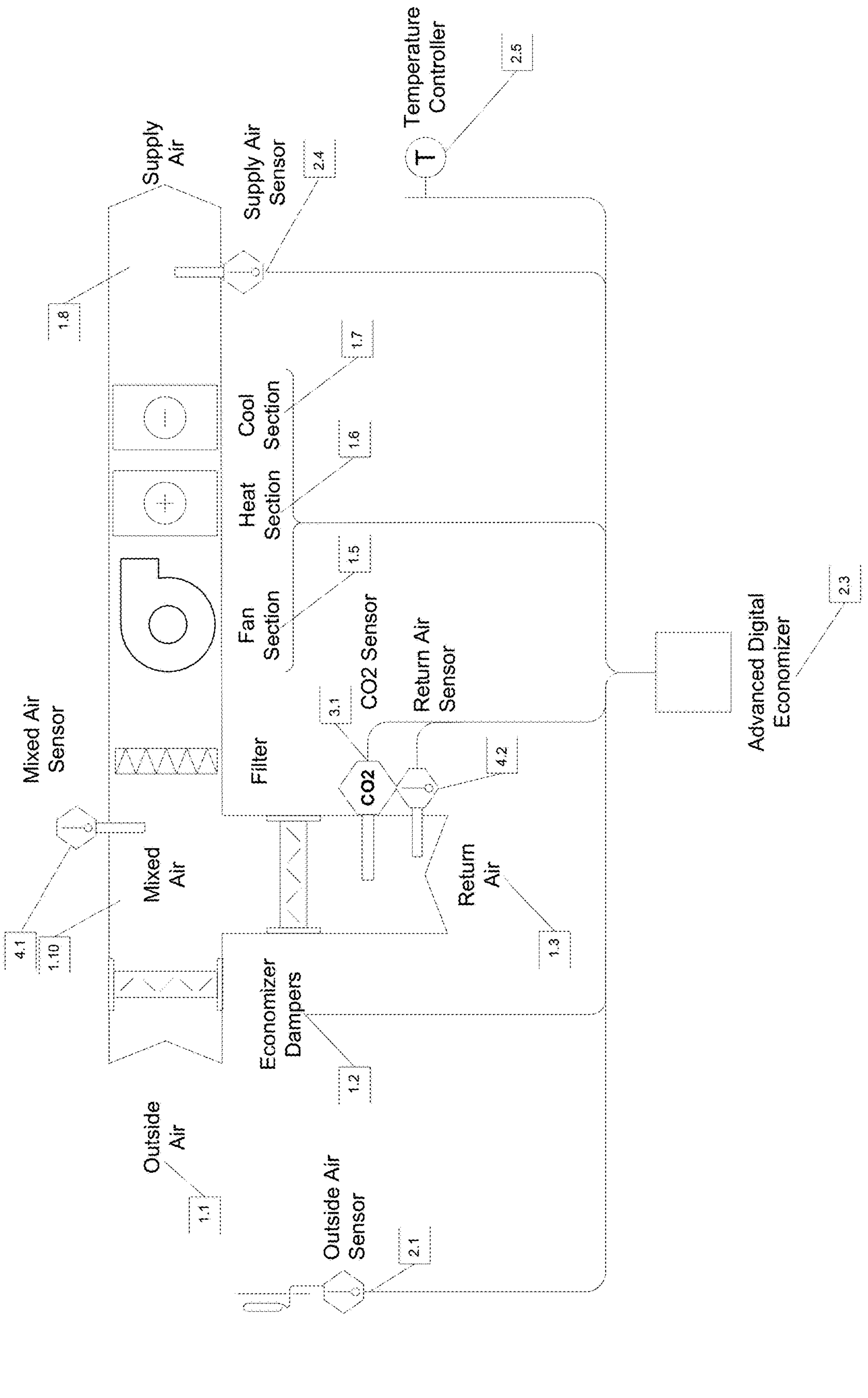
FIG. 4 is a schematic diagram illustrating an alternate embodiment of the present invention including occupancy and return sensors.
Figure 7:
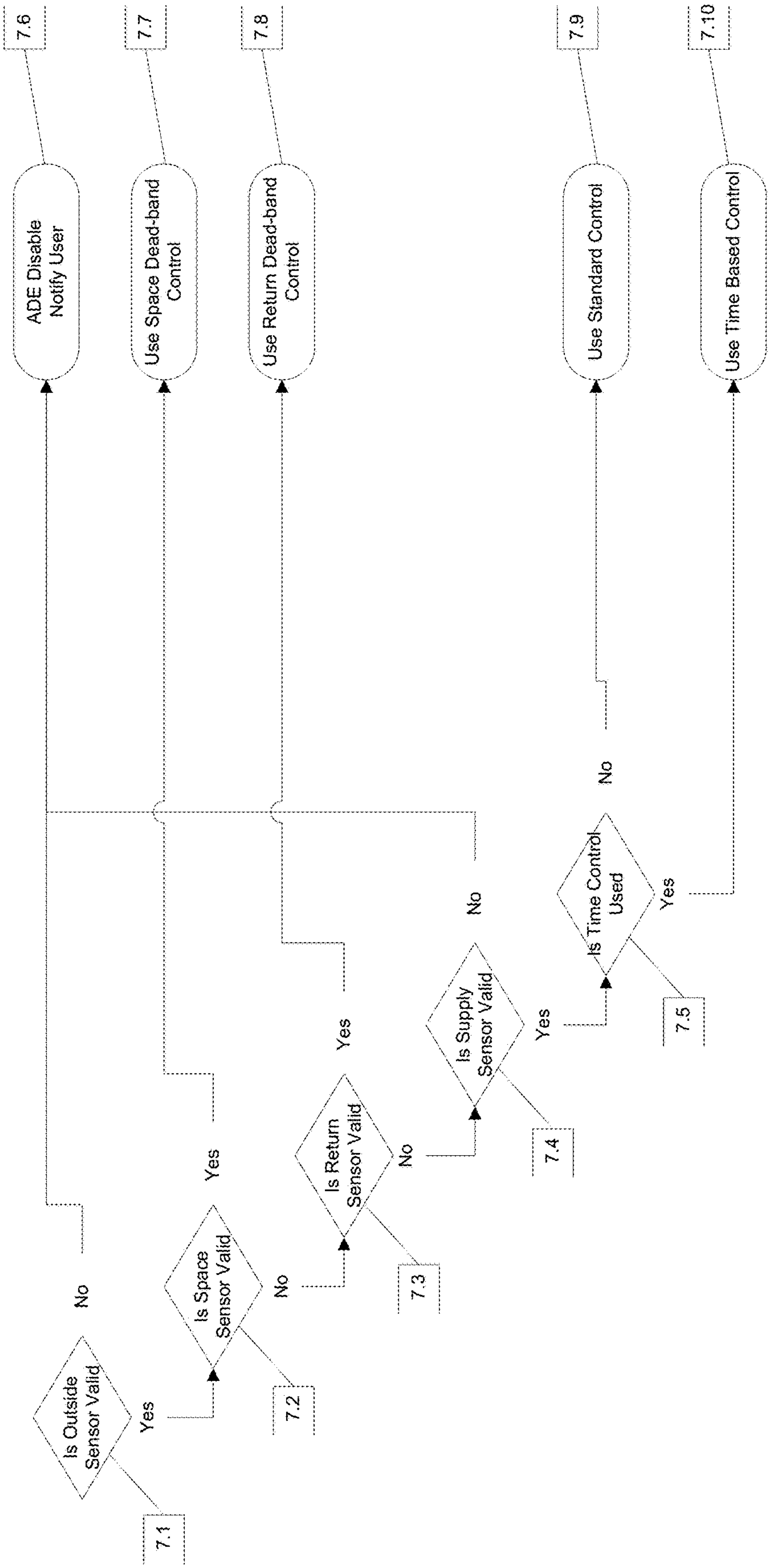
FIG. 7 is a schematic diagram illustrating the control logic for sensor selection.

Referring also to FIGS. 4 and 7, another embodiment of the invention is when the ADE is equipped with a return air sensor [4.2]. The return air sensor will be used to determine the advanced ventilation mode initiation point [7.8], and related process 7.1-7.10. Instead of a fixed high economizer lockout, the advanced ventilation mode will be enabled when the outside air will take less energy to cool than the return air [8.3]. The advanced ventilation mode activation can still be based off of the balance point referencing outside air or it can be based off return air. The self-learning process for the return air will work similar to the outside air self-learning process, as described above [FIG. 8]. Instead of the outside air conditions being logged on a call for heating, the return air conditions are logged when the HVAC system transitions into heating. It will store previous logged values, typically 10, and average the logged values together. The advanced ventilation mode can be enabled when the return air [4.2] temperature is 2° F. greater than the average [8.6] logged values. The economizer damper [1.2] actuator can be modulated to maintain a consistent return air [4.2] temperature at 2° F. greater than the averaged values.

Figure 5:
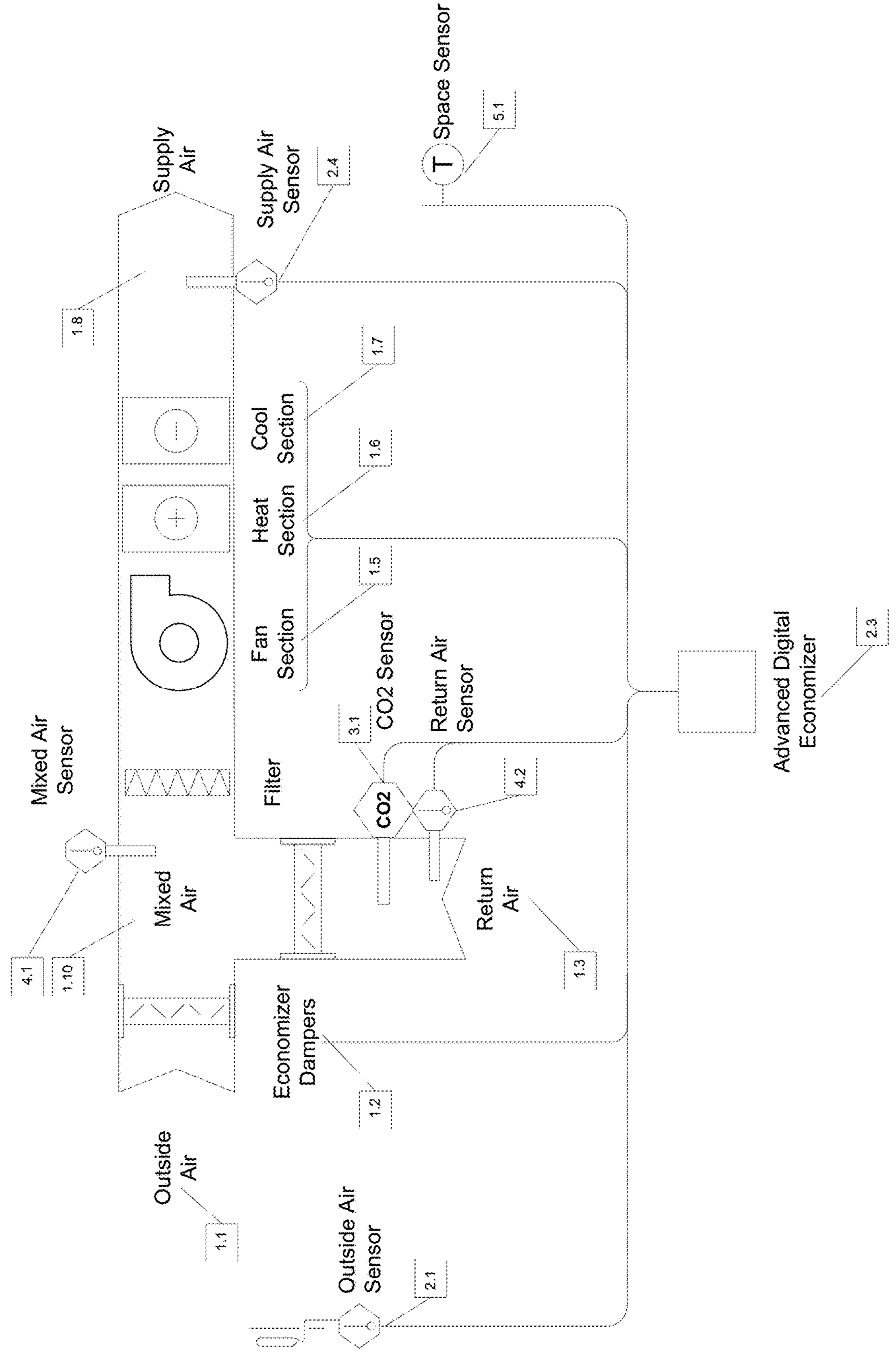
FIG. 5 is a schematic diagram illustrating an alternate embodiment of the present invention including occupancy, return, and space sensors.

When the ADE is equipped with a space sensor, the space conditions will be used to determine when the controller will use the advanced ventilation control [FIG. 5]. When the space temperature is in the dead-band, the unit will be in the advanced ventilation mode. The dead-band is the period when the HVAC system is satisfied and the space conditions are in between the heating and cooling setpoints. Advanced ventilation is an energy saving technique that is designed to prevent over-cooling of the space. If the advanced ventilation mode drives the HVAC system into heating operation, the energy savings that are achieved by advanced ventilation pre cooling will be offset by the wasted heat energy. To prevent over cooling, the economizer actuator can be modulated to maintain the space temperature, for example, at 1° F. above the heating setpoint [8.3].

Figure 1:
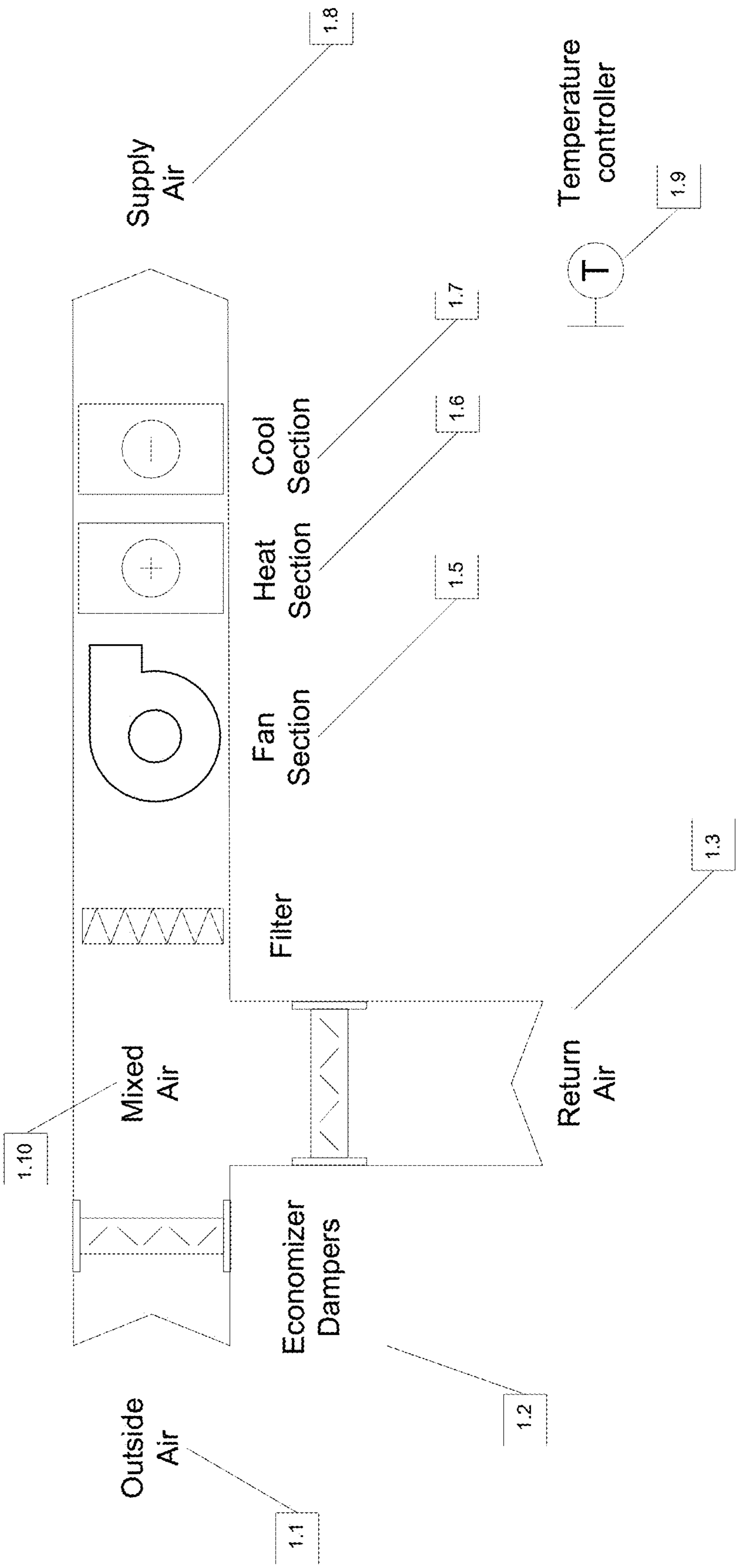
Fig. 1 Prior Art
FIG. 1 is a schematic diagram of a prior art HVAC system illustrating a fan and fan motor, heating, cooling, and an economizer dampers.

Referring now to FIG. 1, the ADE will also have the ability to monitor the outside [1.1], return [1.3], mixed [1.10], supply [1.8], and space environmental conditions. The outside [1.1] air is ambient air that the surrounds the building that the space is contained within. The return [1.3] air is the air coming back from space to the HVAC system. The mixed [1.10] air is a blend of outside and return air before it is treated by the HVAC equipment. The supply [1.8] air is the air that is leaving the HVAC system being supplied to the space. A supply sensor [5.1 in FIG. 5] will reflect any conditioning that is provided by the HVAC system. The space sensor detects the environmental condition of the space that is treated by the HVAC system.

The ADE will support multiple configurations. Changes will be either configured on the controller through dip switches, potentiometers, or through a user interface which can be a local LCD with push buttons, a hand held tool, or a computer interface. The configuration will allow the user to change the application, configure sensors, adjust setpoints, and initiate calibration.

The ADE will control the quantity of outside air that is being supplied to the space by controlling the economizer [1.2], commonly expressed as the economizer position. When the economizer position is indicated in this document, it is referencing the percentage of the outside air in relation to the total air handling capacity of the unit. For example, a 20% economizer position means 20% of the air delivered by the air handler comes through the outside air dampers. Therefore, 80% of the air is being recirculated from the space as return air. If the HVAC system has a constant volume fan, the outside air flow will be adjusted by making changes to the economizer actuator position. If it is a variable volume system, the ADE will control the volume of outside air by controlling both the fan speed and the economizer actuator position. The ADE will modulate the outputs to find the corresponding values that can produce the required air mixture using the lowest amount of energy to achieve the desired outcome. By default, the ADE will first increase the damper position before increasing the fan speed, which results in higher energy use.

Figure 6:
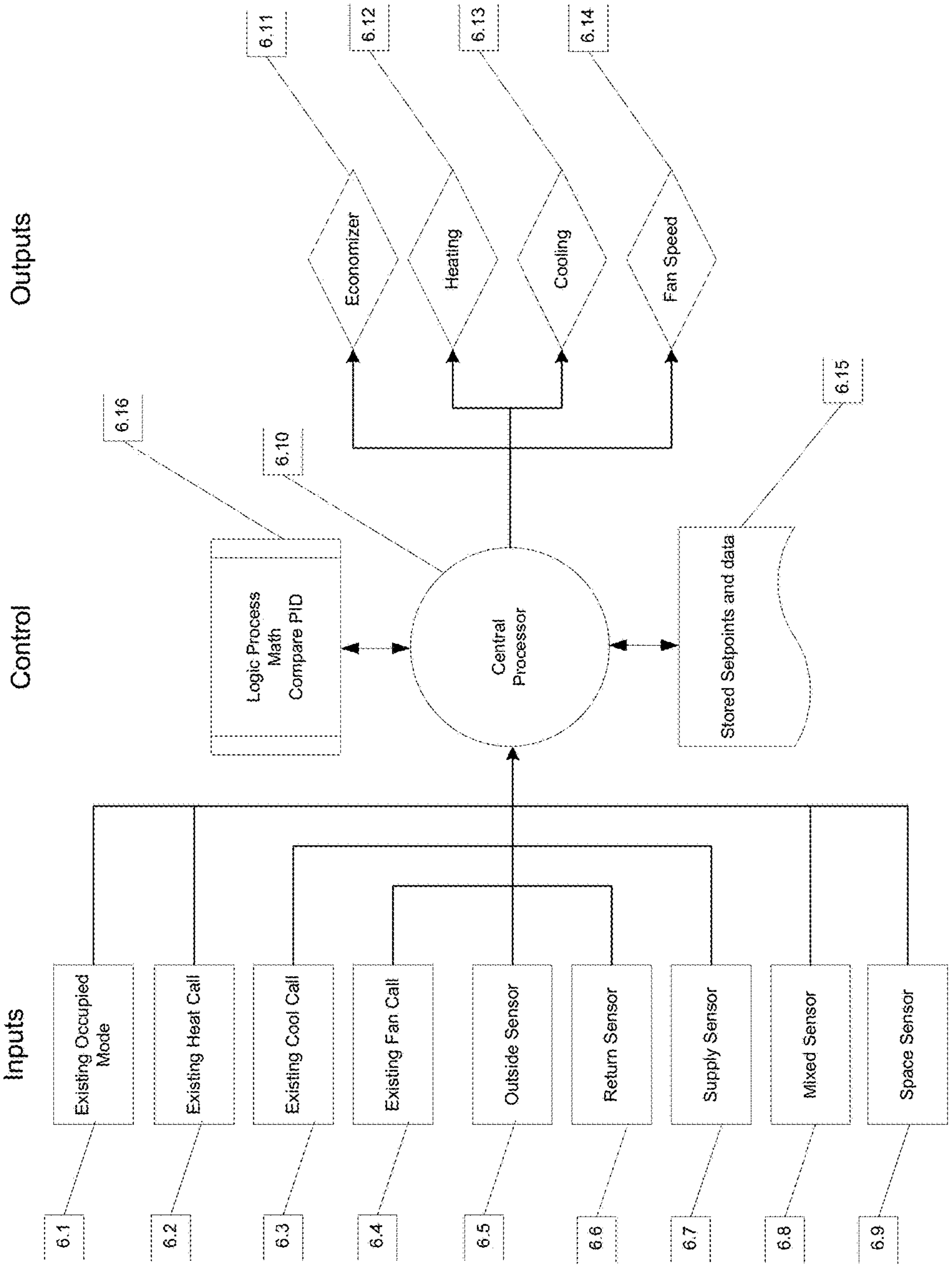
FIG. 6 is a schematic diagram illustrating the block diagram control logic for the present invention.

Referring to FIG. 6, the ADE will utilize a central processor [6.10] to control the economizer and HVAC unit. The central processor will coordinate information from the inputs [6.1-6.9] and stored setpoints or data [6.15] to the logic, math, and control algorithms [6.16] so the ADE can affect the desired action of the HVAC system [6.11-6.14]. The central processor will be able to accept inputs from the HVAC system: occupied command [6.1], heating call [6.2], cooling call [6.3], and fan call [6.4]. It will also process environmental sensor data: outside sensor [6.5], return sensor [6.6], supply sensor [6.7], mixed air sensor [6.8], and space sensor [6.9]. It will be able to send commands to the HVAC system components: economizer [6.11], heating function [6.12], cooling function [6.13], and the fan [6.14].

The ADE can accept signals from the existing temperature controller [1.9] or new temperature controller [2.5]. The most common interface will be though digital inputs. The existing control system will send an on/off command that will be monitored by the ADE. It will be able to accept Stage 1 Heat, Stage 2 Heat, Stage 1 Cool, Stage 2 Cool, and reversing valve commands. The existing control will be routed to the ADE, and the ADE will connect to the HVAC system control terminals. Alternately the ADE can become the temperature controller and replace the existing controls. When the ADE is the temperature controller it will store occupied and unoccupied heating and cooling setpoints [6.15] and it will monitor the space temperature. It will provide the control signals for the fan [1.5], and it will enable the fan to run in the occupied mode. When the space temperature is less than the heat setpoint, heating [1.6] will be enabled. When the space temperature is greater than the cooling setpoint, the unit will go into the cooling mode. When the ADE is in the cooling mode the economizer [1.2] or mechanical cooling [1.7] can be used to meet the demands of the space. The heating or cooling output will increase based on the deviation from setpoint and how long the deviation has existed. It will use proportion, integral, and derivative (PID) control loop and a sequencer [6.16] to stage the conditioning functions. In either connection when the space is occupied and there is no call for heating or cooling, the system is determined to be in the ventilation mode.

Another embodiment of the ADE involves an HVAC system with modulating heating and cooling valves. In this application, the ADE will operate the heating and cooling functions with a varying analog output signal.

Any variation of the ADE can also be configured for demand control ventilation (DCV). DCV is a common practice that is supported by the ASHRAE 62.1 standard. It is used to determine the proper ventilation rate for a building based on occupancy. The most common way to monitor the occupants in a space is by using a CO2 sensor [3.1]. The CO2 sensor provides a voltage output that increase as the CO2 levels in the space increase. The DCV control sequence will be overridden whenever the controller initiates the Advanced Ventilation mode as described below. When DCV is engaged, the minimum ventilation settings will be reset based on the occupancy levels. The minimum and maximum ventilation rates will be set based on ASHRAE 62.1 guidelines, commonly the minimum ventilation rate will be set to 5-10% outside air volume and 20-40% for the maximum rate. As the CO2 in the space increases, the economizer output will increase to maintain the appropriate ventilation rate.

An alternate embodiment would allow ADE to use a timing method to determine when the advanced ventilation mode can be utilized [7.5]. The ADE would consider the space satisfied and to have a cooling disposition when a period of time, such as 45 minutes, has elapsed following the termination of the last heating call [2.7]. The ADE would then modulate the economizer [2.2] to maintain a supply air [2.4] temperature setpoint (such as 60° F.) to prevent overcooling. If no heating calls have happened for the selected time period following the beginning of occupancy, the ADE would then enter the advanced economizer mode and modulate the economizer [2.2] to achieve a supply air temperature such as 65° F. The occupied period is assumed to have occurred when the supply fan command [2.6] transitions from off to on.

When one or more valid environmental sensor is connected to the ADE, the ADE may automatically select the application mode that is used to determine the dead-band range. [FIG. 7.] The sensor is considered to be valid if there is a proper electrical reading and if the value is changing at regular intervals. The valid sensor with the highest priority is used to establish the setpoints and the measured variable that will determine advanced economizer mode. The space sensor would typically have the greatest priority [7.2], the return sensor will typically have the next highest priority [7.3], and the outside air sensor will typically have the lowest priority [7.1].

For example: if the space sensor is valid [7.2], the dead-band range will be the occupied heating and cooling setpoints [7.7]. If the sensor goes invalid, the ADE will transition to the return air sensor [7.3], and the return air high economizer lockout and balance point setting is used to establish the dead-band range [7.8].

If the ADE is controlling based on the outside air sensor and if either of the supply outside air sensors returns an invalid reading, the ADE would be disabled from operating [7.6].

Figure 9:
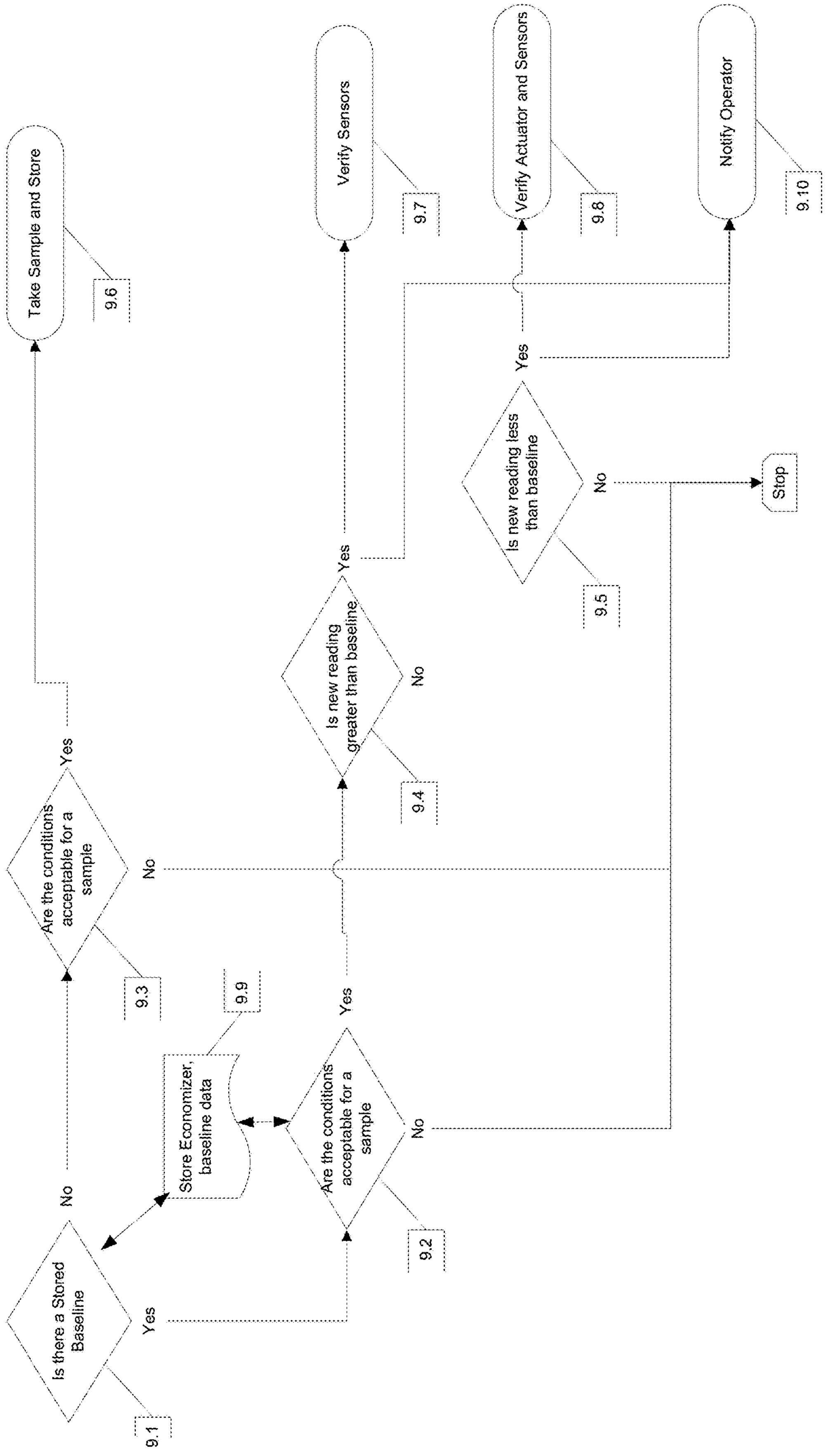
FIG. 9 is a schematic diagram illustrating the control logic for the economizer fault detection.

Referring now to FIGS. 4 and 9, the ADE has the ability to verify proper economizer operation. When there is at least a 10° F. difference between the outside air and the return air, the conditions are acceptable to verify the economizer performance. The first step is to establish a baseline for the economizer effectiveness. If the ADE is equipped with a mixed air sensor [4.1], the mixed air sensor would be used. If there is no mixed air sensor [4.1], the supply air sensor [2.4] will be used. The supply air sensor value will be adjusted to compensate for the heat from the supply fan motor. The user will set the motor horsepower in the controller, and the controller will automatically calculate the heat output. The controller will be able to calculate the heat from the motor by factoring in different motor speeds. The controller will take readings of the Outside [2.1], Return [4.2], and Mixed [4.1] or Supply [2.4] air sensor(s), and a mass air flow calculation will be used to determine the actual percentage of outside air to return. The economizer efficiency is the measure of the actual performance of the economizer (as determined by the mass flow calculation) expressed as a percentage when it is compared to a theoretical perfect economizer. The economizer efficiency value is stored in the controller [9.9]. The process is completed again at regular intervals or it can be manually initiated at the controller [9.1-9.6]. Newer samples are compared to the baseline value [9.2]. If the economizer efficiency has increased or improved [9.4], it would likely indicate a sensor drift or sensor failure [9.7]. If the economizer efficiency has decreased [9.5], it could indicate a sensor failure or a problem with the economizer damper and actuator assembly

[9.8]. These problems can be indicated by a flashing LED on the controller or through an external user interface [9.10]. The baseline economizer efficiency can be reestablished at any point by triggering a recalibration procedure.

The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that its patent rights not be limited by the particular embodiments illustrated and described herein, but rather by the following claims interpreted according to accepted doctrines of claim interpretation, including the Doctrine of Equivalents and Reversal of Parts.

What is claimed is:

1. A method comprising:

receiving, with a controller, an indoor temperature from an indoor space sensor located in an indoor building space, the controller being in communication with an HVAC system that is configured to provide heating in response to a call for heating from a temperature controller and to provide cooling in response to a call for cooling from the temperature controller;

comparing, with the controller, the indoor temperature with a dead-band range having a heating setpoint and a cooling setpoint, the cooling setpoint being greater than the heating setpoint, the call for heating being generated by the temperature controller in response to the indoor temperature being less than the heating setpoint and the call for cooling being generated by the temperature controller in response to the indoor temperature being greater than the cooling setpoint; and operating, with the controller, the HVAC system in an economizer mode to cool the indoor building space by introducing outside air to the indoor building space, prior to the call for cooling being received, in response to the indoor temperature being within the dead-band range and increasing.

2. The method of claim 1 wherein operating, with the controller, the HVAC system in the economizer mode includes modulating an outdoor air damper between a fully closed and a fully opened position to maintain a supply air setpoint.

3. A system comprising:

a controller in communication with an HVAC system that is configured to provide heating to an indoor space in response to a call for heating from a temperature controller and to provide cooling to the indoor space in response to a call for cooling from the temperature controller, the controller being configured to:

receive an indoor temperature from an indoor space sensor located in the indoor building space;

compare the indoor temperature with a dead-band range having a heating setpoint and a cooling setpoint, the cooling setpoint being greater than the heating setpoint, the call for heating being generated by the temperature controller in response to the indoor temperature being less than the heating setpoint and the call for cooling being generated by the temperature controller in response to the indoor temperature being greater than the cooling setpoint; and operate the HVAC system in an economizer mode to cool the indoor building space by introducing outside air to the indoor building space, prior to the call for cooling being received, in response to the indoor temperature being within the dead-band range and increasing.

4. The system of claim 3 wherein the controller is further configured to operate the HVAC system in the economizer mode by modulating an outdoor air damper between a fully closed and a fully opened position to maintain a supply air setpoint.

5. A system comprising:

an HVAC assembly configured to provide heating, cooling, and ventilation functions to an indoor building space, the HVAC assembly including a variable speed fan that is initially operated at an initial speed;

an economizer configured to provide an economization function to the indoor building space, the economizer including at least one damper to outside air;

an inside air sensor configured to sense an indoor temperature of the indoor building space;

a controller configured to:

receive the indoor temperature sensed by the inside air sensor;

compare the indoor temperature with a dead-band range having a heating setpoint and a cooling setpoint, the cooling setpoint being greater than the heating setpoint;

in response to determining that the indoor temperature is greater than the heating setpoint, less than the cooling setpoint, and increasing: (i) operate the economizer in a cooling mode to introduce outside air to the indoor building space prior to a call for cooling being received and (ii) maintain a target airflow of outside air being introduced to the indoor building space through the economizer by increasing an opening of the at least one damper and decreasing a speed of the variable speed fan to less than the initial speed.

6. The system of claim 5 wherein the initial speed is a full speed of the variable speed fan.

* * * * *